United States Patent
Markkanen

(10) Patent No.: US 7,240,079 B2
(45) Date of Patent: Jul. 3, 2007

(54) METHOD AND ARRANGEMENT FOR SECURING A DIGITAL DATA FILE HAVING FINANCIAL VALUE, TERMINAL OPERATING IN THE ARRANGEMENT, AND SOFTWARE APPLICATION EMPLOYING THE METHOD

(75) Inventor: Panu S. Markkanen, Oulu (FI)

(73) Assignee: Nokia Corporation, Espoo (FI)

( * ) Notice: Subject to any disclaimer, the term of this patent is extended or adjusted under 35 U.S.C. 154(b) by 327 days.

(21) Appl. No.: 10/185,370

(22) Filed: Jun. 27, 2002

(65) Prior Publication Data
US 2003/0005244 A1  Jan. 2, 2003

(30) Foreign Application Priority Data
Jun. 29, 2001  (FI) ................... 20011397

(51) Int. Cl.
*G06F 17/30* (2006.01)
*G06F 12/00* (2006.01)
(52) U.S. Cl. ............. 707/204; 707/202; 711/161; 711/162
(58) Field of Classification Search ............ 707/9, 707/202, 204, 200; 711/161, 162
See application file for complete search history.

(56) References Cited
U.S. PATENT DOCUMENTS

| 4,817,140 | A | * | 3/1989 | Chandra et al. | 705/55 |
| 5,822,771 | A |   | 10/1998 | Akiyama et al. | 711/162 |
| 6,236,996 | B1 | * | 5/2001 | Bapat et al. | 707/9 |
| 6,357,006 | B1 | * | 3/2002 | Pham et al. | 713/176 |
| 6,477,530 | B1 | * | 11/2002 | Omata et al. | 707/9 |
| 6,647,388 | B2 | * | 11/2003 | Numao et al. | 707/9 |
| 6,714,952 | B2 | * | 3/2004 | Dunham et al. | 707/204 |
| 2002/0156921 | A1 | * | 10/2002 | Dutta et al. | 709/246 |

FOREIGN PATENT DOCUMENTS

| EP | 1061515 A2 | 12/2000 |
| WO | WO 01/31452 | 5/2001 |

* cited by examiner

Primary Examiner—Cam Linh Nguyen
(74) Attorney, Agent, or Firm—Perman & Green, LLP

(57) ABSTRACT

A method for creating an electronic data file from information residing in the memory of a first device operating in a data communication system includes storing information identifying the owner who made a request for the creation of the electronic data file in a backup service in addition to information concerning the electronic data file to be created, sending instructions concerning a procedure used in the creation of the electronic data file from the backup service to the first device, wherein the instructions include information on how the electronic data file to be created will be altered during its creation such that it becomes unusable without further information, creating and processing the electronic data file according to the instructions, and saving the processed electronic data file in a second device.

28 Claims, 5 Drawing Sheets

** METHOD AND ARRANGEMENT FOR SECURING A DIGITAL DATA FILE HAVING FINANCIAL VALUE, TERMINAL OPERATING IN THE ARRANGEMENT, AND SOFTWARE APPLICATION EMPLOYING THE METHOD

BACKGROUND OF THE INVENTION

The invention relates to a method for creating an electronic data file from information stored in the memory of a first device operating in a data communication system so that said electronic data file is created in a second device. The invention also relates to a method for restoring an existing electronic data file to a first device operating in a data communication network from a second device. The invention further relates to a hardware arrangement applying the methods according to the invention. The invention further relates to a terminal of a data communication network applying the methods. In addition, the invention relates to software applications residing on a server connected with a data communication network and on a terminal of a data communication network, which software applications employ a method according to the invention.

BRIEF DESCRIPTION OF RELATED DEVELOPMENTS

Terminals of communication systems are becoming more and more versatile. Hereinafter, the term communication system refers to various radio networks, cellular telephone networks, wire networks or different point-to-point arrangements, for example. In addition to the original speech communication and slow data transfer modern terminals can provide a very wide range of services. For instance, terminals may be used for paying for various purchases. The cost of a purchase may be debited in the phone bill, or electronic money may be stored on a terminal to pay for the purchases. Such an electronic purse is debited by an amount corresponding to the purchase by means of a device at the seller's disposal, for example.

Counterfeiting money is always a crime, and attempts to falsify funds stored in an electronic form in a device can be considered equally criminal. Such a counterfeit attempt may involve e.g. a situation in which the user of a terminal tries to copy electronic credit to another device from which the equivalent sum of money could then be re-used for a number of times.

Text, pictures, logos, tickets, music and video clips, for example, can be downloaded to a terminal from a variety of sources against payment. The pecuniary value of such data files stored in digital form may be considerable. Consequentially, dishonest parties may be tempted to illegally copy such data files from a device to another.

Regardless of how the terminal is used, the owner of the terminal may want to change it. In that case the various electronic data files in the original terminal also have to be transferred to the new terminal. For data files that have no pecuniary value, such a transfer is easily accomplished using a personal computer, for example. Data to be transferred are simply saved into the memory of the computer and then transferred back into the memory of the new device. The problem lies with data files that, for some reason or another, cannot be altered or copied without a special permission. Transfer of such data to an external device, the operation of which cannot be controlled in any way, is usually prevented by means of arrangements included in the hardware or software of the terminal.

One possible solution to the above-mentioned security problem is that the data are not saved in the memory of the terminal but the terminal always receives the data from a server of a data communication system via an online service. This server is able to authenticate the terminals contacting it. The server also knows, on the basis of information stored in its memory, which data files a particular terminal is allowed to use. A terminal may be debited separately for each time it uses the data. Such a method of organization of the sales of data files is secure from the data supplier's standpoint, but its speed is insufficient considering the data rates currently applied e.g. in cellular networks. For example, the transfer of a 64-MB data file in a cellular network would take about three hours, which is not acceptable for the users.

It is also possible that a copy of an electronic data file bought on the terminal is stored in a server in the communication system. Such a copy could then be used to restore data files of a given terminal after an error situation. The copies may be quite large so that transferring them back and forth in the communication system would place a great load on the system. If there occurs an error in the creation or transfer of the copy, the whole data file may be lost or become unusable.

A third possible way to solve the security problem mentioned above is such that the copying of certain electronic data files purchased from outside the terminal is made very difficult by means of either software controlling the operation of the terminal or a smart card attached to the terminal. This way, unauthorized copying of electronic data files can at least be made more difficult, but an unauthorized copying attempt (made on purpose or involuntarily) could result in an error on the terminal that would destroy all electronic data files for good.

SUMMARY OF THE INVENTION

An object of this invention is to provide a method and hardware arrangement that places only a small load on a data communication system and by means of which electronic data files stored in the memory of a terminal of a data communication system can be stored in a second device so that the electronic data files cannot be illegally restored in usable form from said second device.

The objects of the invention are achieved by a method and hardware arrangement in which certain data files stored in a first device are stored, with the assistance of a backup service according to the invention, in a second device from which an electronic data file can be only once restored under the control of the backup service either to the original device that used the electronic data file or, alternatively, to some other device specified by the owner of the electronic data file.

A method according to the invention for creating an electronic data file is characterized in that the phase to create and save an electronic data file comprises a step in which information identifying the owner who made the request for the creation of the electronic data file and information about the electronic data file to be created are stored in a backup service.

A method according to the invention for restoring an electronic data file is characterized in that it comprises a step for establishing a connection from a first device to a backup service in a data communication system, and a step in which data are restored to the first device from an electronic data file in a second device according to an instruction from the backup service.

A hardware arrangement according to the invention is characterized in that information concerning the ownership of an electronic data file and information about the electronic data file to be created are stored in a backup service belonging to the hardware arrangement.

A terminal of a data communication network according to the invention is characterized in that the terminal comprises means for creating an electronic data file from information in the terminal's memory, said means comprising
   means for establishing a connection with a backup service associated with the data communication network, and
   means for sending a save request message to the backup service.

A software application according to the invention for creating an electronic data file, residing on a server associated with a data communication system, is characterized in that it comprises
   means for verifying the reliability of a terminal,
   means for saving information used for identifying the owner of the electronic data file, and
   means for saving information associated with the electronic data file.

A software application according to the invention for restoring an electronic data file, residing on a server associated with a data communication system, is characterized in that it comprises
   means for verifying the validity of information residing on a trusted terminal that made the restore request,
   means for conveying restore instructions to the terminal, and
   means for removing information associated with the electronic data file from the server after the restore instructions have been sent.

A software application according to the invention for creating an electronic data file, residing on a terminal associated with a data communication network, is characterized in that it comprises
   means for presenting information concerning the electronic data file to a backup service,
   means for conveying information identifying the owner of the electronic data file to the backup service when the electronic data file is being created, and
   means for saving the electronic data file to a second device.

A software application according to the invention for restoring an electronic data file, residing on a terminal associated with a data communication network, is characterized in that it comprises
   means for presenting a restore request concerning the electronic data file to a backup service,
   means for receiving from the backup service restore instructions concerning the electronic data file,
   means for transferring the electronic data file to the memory of a trusted terminal from the memory of a second device, and
   means for restoring the electronic data file in a usable form to the memory of the trusted terminal.

Some advantageous embodiments of the invention are specified in the dependent claims.

The basic idea of the invention is as follows: When an electronic data file is to be created from information in the memory of a terminal of a data communication system, the terminal will contact a backup service associated with the data communication system, which backup service will identify the owner of the electronic data file and/or the terminal used by the owner and the data to be saved. Hereinafter, the term "owner" refers to both the owner/user of the device and the terminal used by the owner/user. The backup service saves the information in question into its memory and advantageously gives the terminal an instruction to decrypt or alter the information in question in a manner specified by or known to the backup service. When an electronic data file according to the invention is created, it is at the same time converted such that it cannot be used by the terminal. Having created the electronic data file according to the invention the terminal transfers it into the memory of a second device. When an existing electronic data file is to be restored to the terminal, either to the original one or some other terminal, the owner of the data file requesting a restore contacts the backup service and indicates which electronic data file it wants to restore into its memory in the original form. If the owner is successfully authenticated, the backup service sends to the terminal the information with which the electronic data file can be restored in usable form. When the restoring instructions have been successfully sent, the backup service deletes the information concerning the electronic data file in question. The terminal can now convert the electronic data file so that it can be used and save it into its memory.

An advantage of the invention is that the electronic data file in its entirety need not at any point be transferred in the data communication system serving the terminal, thus saving the resources of the data communication system.

Another advantage of the invention is that from the user's point of view, saving and restoring the data can be accomplished more quickly than if all of the data should be transferred to the backup service.

A further advantage of the invention is that an electronic data file on a terminal can be copied to any other device in such a way that the data of a copy cannot, however, be illegally transferred to another device.

A yet further advantage of the invention is that memory capacity need not be allocated in the data communication system for storing the electronic data files of terminals of the data communication system.

A still further advantage of the invention is that the user of a terminal can freely be given a chance to transfer an electronic data file from a terminal to another.

BRIEF DESCRIPTION OF THE DRAWINGS

The invention is below described in detail. The description refers to the accompanying drawings in which.

DETAILED DESCRIPTION OF THE PREFERRED EMBODIMENT(S)

Figure 1:
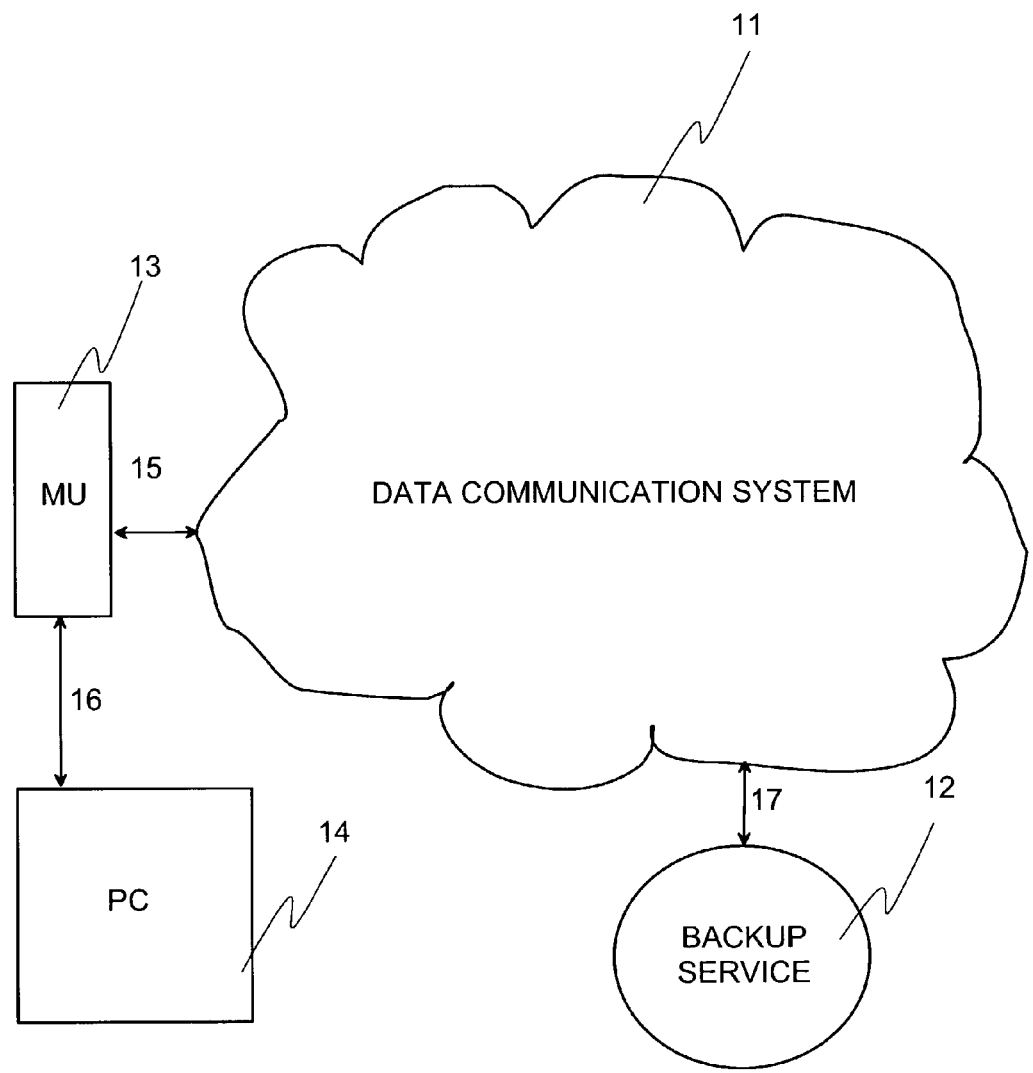
FIG. 1 shows as an example the components belonging to the arrangement according to the invention.

FIG. 1 shows as an example the components belonging to the arrangement according to the invention. The arrangement comprises a data communication system 11, advantageously a radio network based on wireless transmission of messages. Such a radio network advantageously comprises a plurality of separate cells and associated hardware which together constitute an entity that hereinafter is called a service network. Such service networks are e.g. wireless local area networks and various cellular telephone networks. At least one server is associated with the data communication system 11 according to the invention, which server assists terminals 13, advantageously mobile terminals, connected to the data communication system, in creating the required electronic data files and in controlling the restoration of a data file. In FIG. 1 this server/function is represented by a backup service, reference 12, connected, advantageously through a fixed connection 17, to a device belonging to the data communication system 11. Communication in the data communication system includes both the normal exchange of messages between the terminal 13 and the communication system 11 and messages transferred during the creation/restoration of electronic data files according to the invention. The messages transferred in the creation and restoration of electronic data files according to the invention are advantageously always encrypted between the terminal and backup service 12 using a technique according to the prior art.

Operating in a data communication system 11 according to FIG. 1 there is a mobile terminal 13 which communicates with the data communication system 11 advantageously through a wireless connection 15. This device is hereinafter called the first device. The first device 13 has been identified as a trusted device by a service provider operating in the data communication system 11 (e.g. trusted device having a certificate given and electronically signed by a third party), whereby a service/product from the service provider has been stored in the device against payment, for example. For the terminal to be classified as a trusted device, part of its memory has to be defined as secure memory that can be used only in processes meeting certain specified criteria.

The terminal 13 is advantageously a terminal of a cellular network. Apart from the aforementioned demand concerning the protected memory the operation according to the invention does not place any other special demands on the mechanical or electrical construction of the terminal. Thus the terminal may be almost a conventional cellular terminal the control software of which additionally includes a software application that enables the creation and restoration of an electronic data file.

The method according to the invention for creating and restoring an electronic data file requires a separate second device 14 into which the electronic data file is saved in altered form. Unlike the first device, this second device need not necessarily be identified as a trusted device by the service provider operating in the data communication system. In the example of FIG. 1, the second device 14 is a personal computer PC. It is obvious to a person skilled in the art that any device having enough memory capacity to create an electronic data file according to the invention can be used as the second device according to the invention. A connection 16 can be established from the terminal 13 to the second device 14. The connection may be a fixed connection via a cable, an infrared link or a connection implemented using a radio link, such as a Bluetooth connection, for instance. Furthermore, the second device 14 may be connected with the data communication system 11 through a similar link as the first device 13.

In an advantageous embodiment of the invention the backup service 12 always permits the trusted first device 13 to create an electronic data file. The backup service 12 saves into its memory the identification information concerning the owner (trusted terminal) of the data file and advantageously some other information concerning the electronic data file itself. This other information advantageously comprises information about how the electronic data file has been modified and how it can be restored. The electronic data file itself is not transferred to the memory of the backup service 12 associated with the data communication system 11. This saves the transmission resources of the data communication system 11 considerably. Having saved the above-mentioned identifying information for the electronic data file into its memory the backup service 12 permits the trusted first device 13 to create an electronic data file in the second device 14. This electronic data file is, however, created advantageously modified in a manner controlled/specified by the backup service. This way, the electronic data file cannot be opened without a restore instruction/permission from the backup service 12.

When the owner wants to restore the information in the electronic data file back into the trusted first device 13, in this advantageous embodiment the trusted first device asks the backup service 12 for a permission to do so. The backup service 12 checks the authenticity of the identification information of the trusted first device 13 and if the information is valid, it sends to the first device 13 the information needed for restoring the electronic data file. Having received an indication of a successful restoration the backup service 12 erases from its memory all identification information concerning the electronic data file in question. This way, an electronic data file can only be used once to restore files to a trusted device 13. This trusted device 13 may be the first device in which the electronic data file was originally created or some other device identified as a trusted device. If an electronic data file according to the invention is created in a second trusted device, it can be restored direct to this second trusted device which means in practice that it is possible to carry out a controlled data transfer from one trusted device to another trusted device.

In another embodiment of the invention a first device 13 creates on its own initiative an electronic data file from information in a second device 14 using a method known to and/or selected by the first device 13 without asking for a permission from the backup service 12. Having created the electronic data file the first device 13 contacts the backup service 12 and informs the latter about the electronic data file and the method used to create it. In this embodiment the file is restored advantageously as follows. A trusted device 13 requesting for file restoration sends to the backup service 12 a restore request identifying the file to be restored. If the backup service recognizes the first device requesting for restoration, it sends a message to the latter indicating the method with which the restoration can be successfully executed. Having received an acknowledgment of a successful file restoration the backup service 12 erases from its memory the information concerning the electronic data file in question.

Figure 2A:
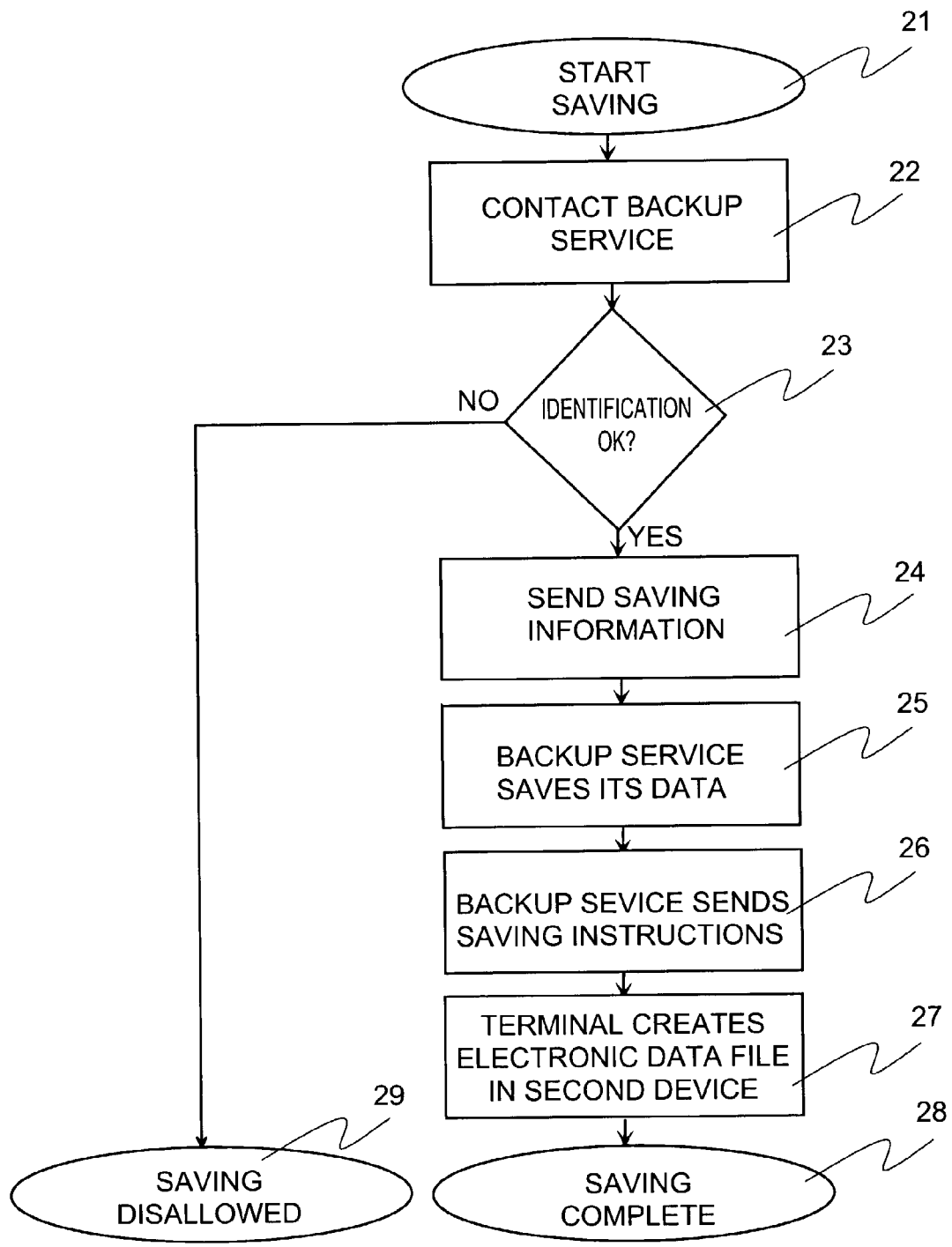
FIG. 2a shows as an example a flow diagram illustrating the creation of an electronic data file according to a first embodiment of the invention from existing data.

FIG. 2a shows as an example a flow diagram illustrating how an electronic data file is created using a method according to a first advantageous embodiment of the invention. In step 21 the user of a trusted first device wants to create an electronic data file from at least one piece of information stored in electronic form in his terminal 13. This piece of information may be e.g. copyrighted material such as an audio recording or a literary work. If electronically usable funds have been saved in the first device, the user of the first device can transfer these funds to a temporary non-trusted second device using an electronic data file according to the invention. In the next step 22 the trusted first device MU 13 contacts a backup service 12 via a data communication system 11. This contact, as well as the identification of the trusted first device, can be advantageously executed using a WAP WTLS level 3 protocol (WAP WTLS: Wireless Application Protocol, Wireless Transport Layer Security). A terminal operating in accordance with the protocol sends its messages encrypted, it can identify the server at the other end of the connection, and it sends the information identifying the terminal to the receiving server for an identification to be carried out at the server end.

In step 23 the backup service 12 makes a decision about whether the trusted first device 13, which requests for service, has been identified or not. If the identification is accepted, the first device 13 sends, if necessary, the data of the electronic data file proper in step 24. These data advantageously include a description of the type of information for which the electronic data file is to be created. In step 25 the backup service saves into its memory the above-mentioned data for the first device which wants to create the electronic copy and for the information to be copied. If in step 23 the first device contacting the service is not identified as a trusted device, the backup service 12 prevents the creation of the electronic data file by shutting down the connection between itself and the device that contacted it.

In step 26 the backup service 12 sends to the trusted first device 13 instructions on how it should process the information to be copied in conjunction with the electronic data file to be created. These instructions advantageously include a cipher key which the trusted first device 13 should use in making the electronic data file. Also during step 26 the first device 13 executes other possible actions in accordance with the instructions obtained from the backup service 12. These actions may include the encryption of all of the data using the cipher key sent to the trusted first device or modifications in the contents of the electronic data file according to the instructions from the backup service in order to prevent the use of the data file. Such modifications may involve e.g. the removal of the electronic signature from the electronic data file created, whereby the electronic data file becomes extremely difficult to use. The removed part of the electronic data file is advantageously transferred into the memory of the backup service 12. After these measures the data is in such a form that it is unusable as such.

In step 27 the trusted first device saves the encrypted/processed electronic data file into a second, non-trusted device 14. The saved data are in the memory of the device 14 in such a form that they cannot be utilized in the device or in any other device to which they could be transferred from the device 14. The process thus comes to step 28 at which the electronic data file resides in the memory of the non-trusted device 14.

Figure 2B:
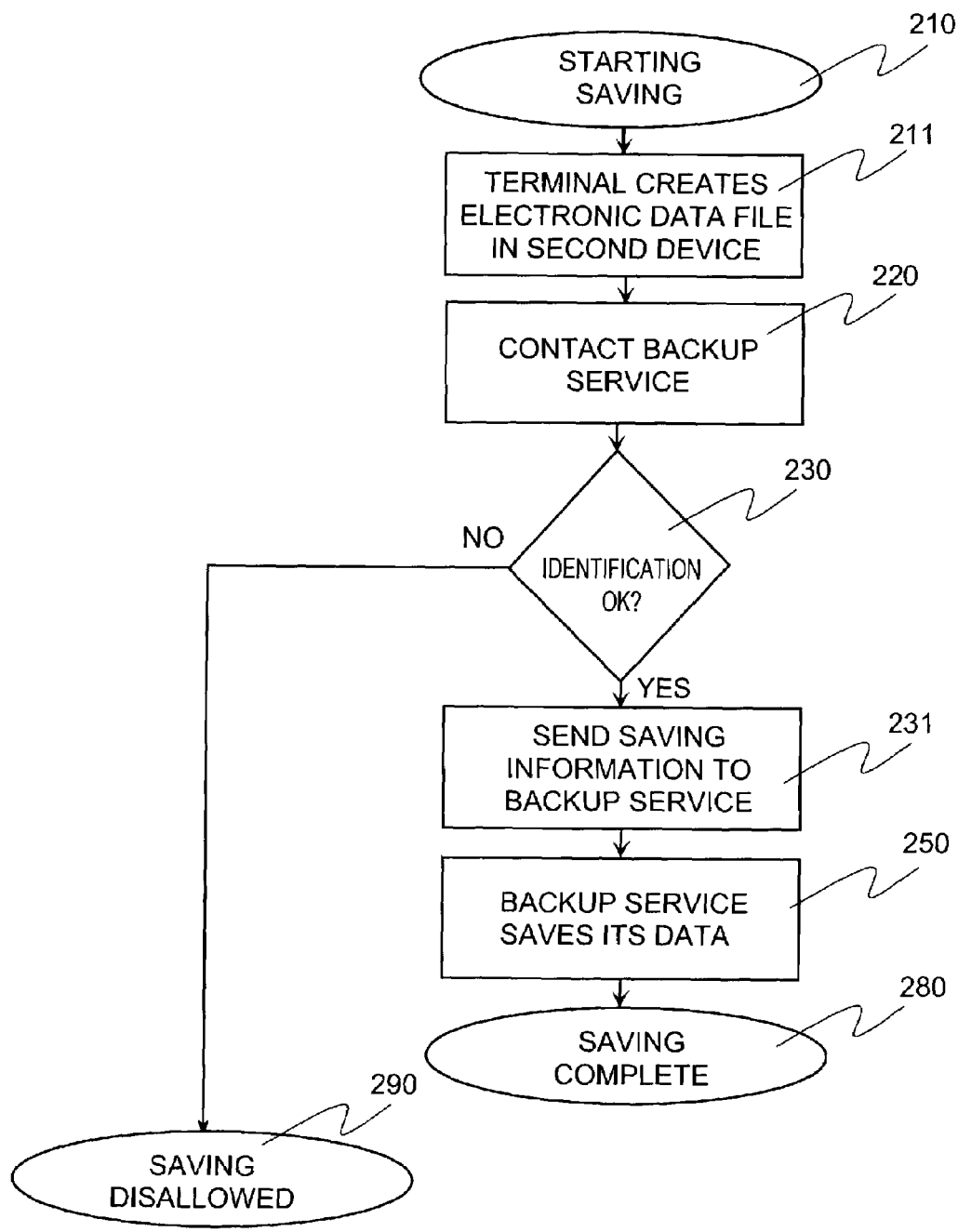
FIG. 2b shows as an example a flow diagram illustrating the creation of an electronic data file according to a second embodiment of the invention from existing data.

FIG. 2b shows as an example a flow diagram illustrating the main phases of the creation of an electronic data file according to a second embodiment of the invention. The procedure starts at step 210 after which in step 211 the terminal 13 creates an electronic data file in a second device 14 using a known technique. In step 220 the terminal 13 contacts a backup service 12. If the backup service 12 associated with the data communication system 11 finds in step 230 that the request for creating an electronic data file comes from a known trusted first device 13, it receives in step 231 the identification information of the device and other information concerning the type of the data file provided by the terminal. In step 250 the backup service saves the received data into its memory. The procedure ends at step 280 by which the electronic data file has been created. If for a reason or another the contacting terminal 13 is not identified in step 230, the backup service 12 shuts down the communication connection, thus preventing the creation of the data file according to the invention, step 290.

An electronic data file created using the procedure according to the second embodiment of the invention can be restored using the restore procedure according to the first embodiment.

Figure 3:
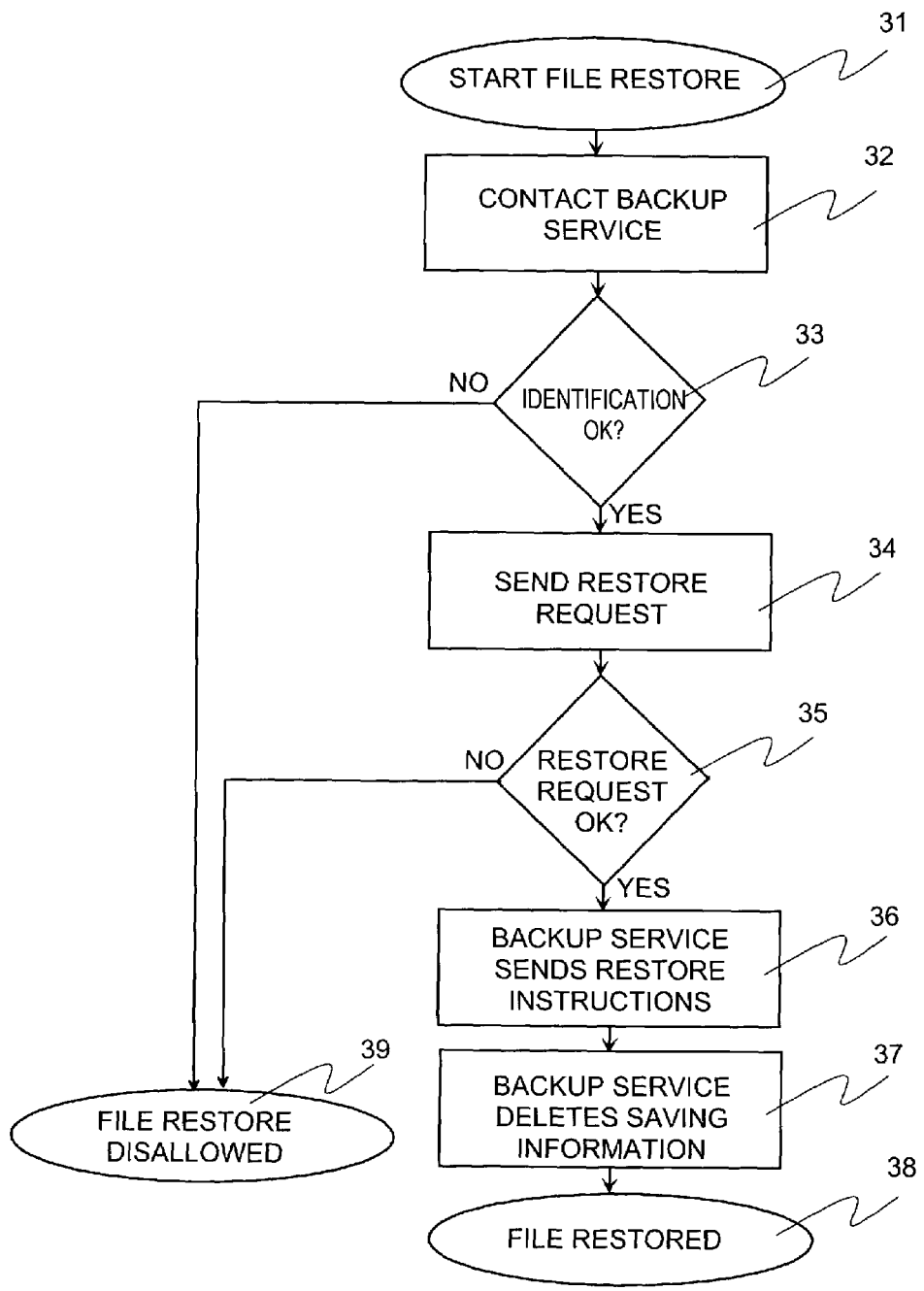
FIG. 3 shows as an example a flow diagram of data file restoration for an electronic data file according to the invention.

FIG. 3 shows as an example a flow diagram of how a desired piece of information is restored to a trusted device from an existing electronic data file. This trusted device may be the same device from which the data originally came from. However, for a reason or another, the user may change devices, so advantageously the data can also be restored into another trusted device. Naturally the method according to the invention can be used to transfer the right of use of a file to some other person.

The restore process starts from step 31. A trusted first device 13 wants to restore an electronic data file into its memory from a second device 14. In step 32 the first device 13 contacts a backup service 12 advantageously using a WAP WTLS level 3 protocol. This establishment of connection advantageously also includes the identification of the contacting device shown in step 33. If the backup service 12 does not recognize the contacting device 13, it prevents the restoration of the electronic data file by shutting down the connection between itself and the first device, bringing the process to step 39. In step 34 the first device 13 advantageously sends a restore request for an electronic data file to the backup service 12. This restore request advantageously includes information specifying the electronic data file to be restored. Advantageously the restore request also includes some data about the electronic data file on the basis of which the backup service can verify that the electronic data file is downloaded back into the first device in an encrypted form. In step 35 the backup service 12 compares the data in the restore request against data in its memory concerning the electronic data file. If the data do not match, the process is not continued but the connection with the first device is shut down, bringing the process again to step 39.

If the identifying information of the electronic data file is acceptable in step 35, the backup service 12 permits in step 36 the restoration of the data in the electronic data file. This restore permit given to the first device 13 advantageously also includes the information/cipher key by means of which the electronic data file transferred from the memory of a non-trusted device 14 to the first device 13 can be converted back into usable form. At this stage, the connection between the terminal 13 and backup service 12 has to be such (e.g. WAP WTLS level 3) that the information/cipher key used in the restoration of the electronic data file is saved into the memory of the trusted first device 13 in the secure part of the memory the contents of which normally cannot be read. This information/cipher key can be used only this one time to restore the information contained in the electronic data file. After a successful restoration the trusted first device 13 erases the cipher key from its memory.

In step 37 the backup service 12 erases from its memory the information related to the restoration of the electronic data file. However, this is only done after it has been verified that the restoration of the file was successful at the terminal 13. This erasure of information ensures that only one restoration can be performed for one electronic data file according to the invention, for the memory of the backup service 12 no longer holds information about how a copy of the electronic data file possibly still residing in the memory of the non-trusted device 14 could be opened or converted usable.

The restore process ends at step 38 in which the trusted first device 13 re-saves the opened electronic data file into its memory in a usable form.

Figure 4:
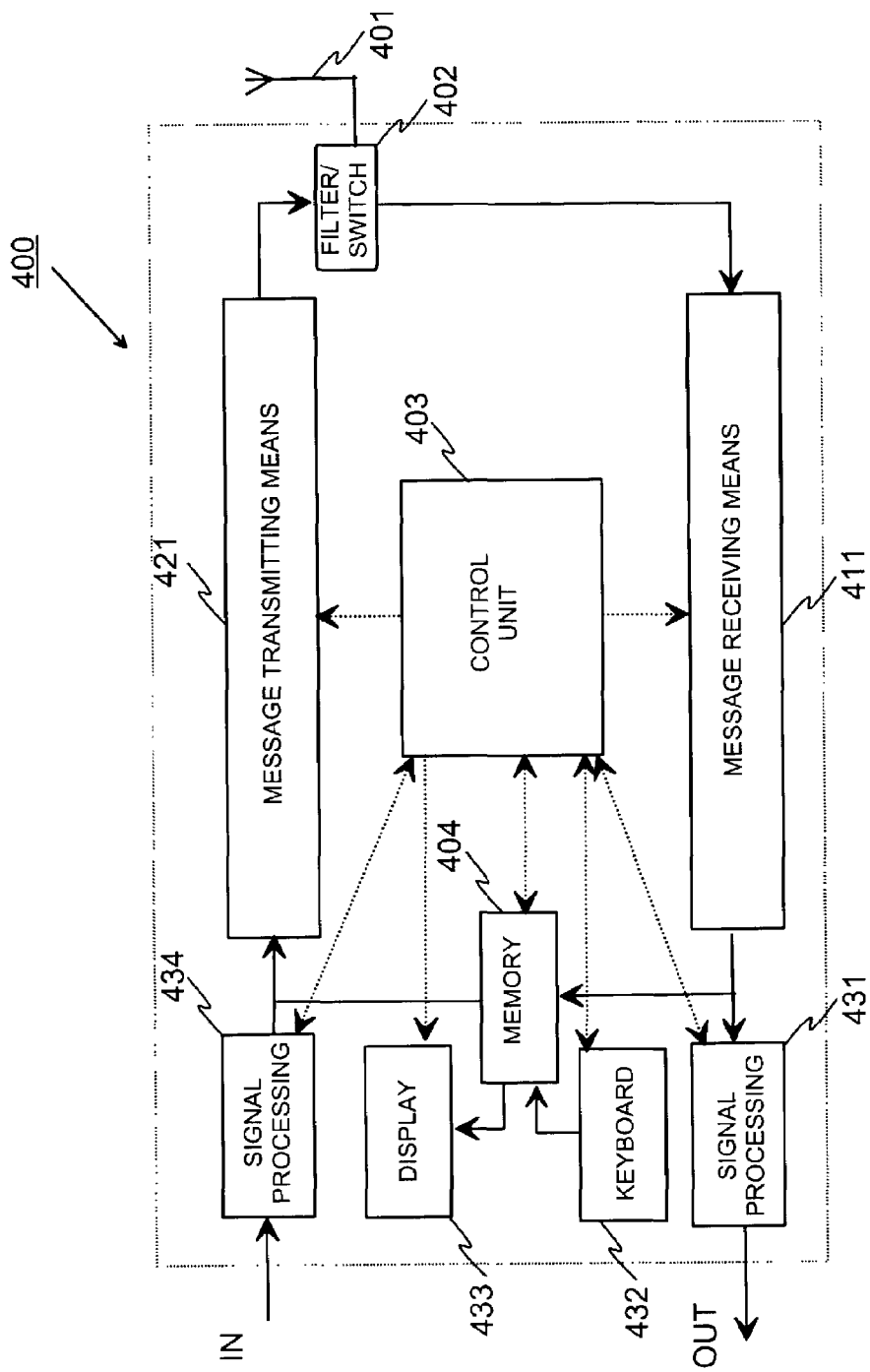
FIG. 4 shows as an example a cellular network and a terminal thereof which is capable of applying the method according to the invention.

The method according to the invention can be applied in any existing cellular network. FIG. 4 shows a simplified block diagram of a cellular network terminal 400 applying the procedure according to the invention. The user interface of the terminal advantageously comprises a display 433 and keyboard 432.

The terminal 400 also comprises an antenna 401 to receive RF signals from base stations of the cellular network. A received RF signal is conducted by a switch 402 to a RF receiver 411 where the signal is amplified and converted digital. The signal is then detected and demodulated as well decrypted and deinterleaved. Signal processing is then performed in block 431. The received data may be saved as such into the terminal's memory 404 or alternatively the processed data are transferred after signal processing to an external device. A control unit 403 controls the aforementioned receiving functions in accordance with a program stored in the unit.

Transmission from the terminal 400 is accomplished e.g. as follows. Controlled by the control unit 403, block 434 performs possible signal processing on the data. Block 421 performs interleaving and encryption on the processed signal to be transmitted, bursts are generated from the data which are modulated and then amplified into a RF signal to be transmitted. The RF signal to be transmitted is conducted to the antenna 401 via switch 402. Also the aforementioned processing and transmission functions are controlled by the control unit 403. The terminal 400 uses the transmission block 421 to transmit the messages to the base stations in the cellular network.

From the invention's standpoint, essential components in the cellular terminal 400 shown in FIG. 4 are the terminal's memory 404, part of which is allocated for saving the data needed in the operation according to the invention, and the control unit 403 which processes the information contained in the messages and normally controls the operation of the terminal 400. In addition, at least part of the memory 404 in the cellular terminal 400 has to be defined as secure memory the contents of which can only be used during operation according to the invention. Moreover, in association with the control unit 403 there is executed a software application according to the invention which in conjunction with the creation and restoration of an electronic data file controls the operation of the control unit 403 in the manner described above.

Furthermore, the method according to the invention requires that in the cellular network there is a resource which is capable of executing the tasks of the backup service according to the invention. Advantageously this functionality can be provided by one or more servers connected with the cellular network. Of course the backup service according to the invention may also be realized as a sub-function of some already existing server in the network. In that case, software has to be installed in that server, implementing the steps of the method according to the invention.

Embodiments according to the invention were described above. The invention is not limited to those embodiments. For example, the communication between a trusted device and backup service may be realized using some other protocol than the exemplary protocol used in the embodiments described above. In addition, the inventional idea can be applied in numerous ways within the scope defined by the claims attached hereto.

The invention claimed is:

1. A method for creating an electronic data file from information residing in the memory of a first device operating in a wireless data communication network comprising:
   storing information identifying the owner who made a request for the creation of the electronic data file in a backup server in addition to information concerning the electronic data file to be created;
   directly sending instructions concerning a procedure used in the creation of the electronic data file from the backup server to the first device, wherein said instructions include information on how the electronic data file to be created will be altered during its creation such that it becomes unusable without further information;
   creating and processing the electronic data file in the first device according to the instructions; and
   transferring the processed electronic data file directly from the first device to a second device without using resources of the wireless data communication network.

2. A method according to claim 1, wherein creating and saving the electronic data file comprises:
   using the first device to save the processed electronic data file into the second device;
   establishing a communication connection with the backup service and identifying the first device;
   using the first device to send to the backup service information describing the type of the electronic data file; and
   using the backup service to save the information received from the first device.

3. A method according to claim 1 wherein the first device is identified as a trusted device by the backup service.

4. A method according to claim 3 wherein when the first device contacts the backup service for creating an electronic data file, it is identified as a trusted device by the backup service.

5. A method according to claim 1 wherein the second device is a non-trusted device.

6. A method according to claim 1 wherein the instructions concerning the procedures used in the creation of the electronic data file comprise a cipher key which is used for encrypting the electronic data file to be created.

7. A method according to claim 1 wherein the instructions concerning the procedures used in the creation of the electronic data file further comprise instructions specifying that a certain part of the electronic data file is only saved into the backup service.

8. A method according to claim 7 wherein said part to be saved into the backup service is an electronic signature used to verify the electronic data file.

9. A method according to claim 1 wherein at least the first device is a terminal of a radio network.

10. A method according to claim 1 wherein the electronic data file is one of the following: a music file, video file, text file, balance data for electronic money or an application program installed in a device.

11. A method for restoring an existing electronic data file to a first device operating in a wireless data communication network from a second device, which method comprises:
   establishing a connection from the first device to a backup service in the wireless data communication network;
   transferring the existing data file directly from the second device to the first device without using resources of the wireless data communication network; and
   restoring information to the first device from an electronic data file including owner identification in the second device according to instructions directly sent by the backup service, wherein the instructions sent by the backup service to the first device include instructions specifying how the electronic data file should be processed in order to modify it such that it can be used by the first device.

12. A method according to claim 11 which method further comprises:
using the backup service to check whether the first device is a trusted device; using the first device to send a restore request; and
accepting the restore request.

13. A method according to claim 12 wherein the restore request sent by the first device to the backup service comprises identification information concerning an electronic data file stored in the memory of a second device.

14. A method according to claim 13 wherein the backup service compares the information received from the first device against information stored in the memory of the backup service and if they are identical, the backup service sends to the first device instructions for opening the electronic data file.

15. A method according to claim 14 wherein the backup service erases from its memory the information concerning the electronic data file after the opening instructions for the electronic data file have been conveyed to the first device.

16. A method according to claim 11 wherein the instructions sent by the backup service to the first device comprise a cipher key which is used for opening the electronic data file.

17. A method according to claim 11 wherein the instructions sent by the backup service to the first device comprise a part which was removed from the electronic data file when the latter was created, which part is used for restoring the electronic data file.

18. A method according to claim 11 wherein said electronic data file is used to restore data back to the first device from which it was transferred to a second device.

19. A method according to claim 11 wherein the first device is a terminal of a cellular network.

20. A hardware arrangement for creating an electronic data file from information stored in a first device operating in a data communication network, which hardware arrangement comprises:
a wireless data communication network
a backup service in association with the wireless data communication network in which backup service information concerning the owner of the electronic data file as well as information concerning the electronic data file to be created is stored;
at least one first device connected with the wireless data communication network; and
at least one second device to which the electronic data file from the first device is to be directly transferred without using resources of the wireless data communication network, wherein the backup service gives to the first device instructions on how to alter the electronic data file before transfer such that it becomes unusable without further information.

21. A hardware arrangement according to claim 20 wherein the information to be stored in the backup service comprises a cipher key used for creating the electronic data file.

22. A hardware arrangement according to claim 20 wherein the backup service comprises a separate server in connection with the data communication system.

23. A hardware arrangement according to claim 20 wherein part of the memory of the first device is arranged to be secure memory into which the instruction/information obtained from the backup service is to be stored in order to enable the opening of the electronic data file.

24. A hardware arrangement according to claim 20 wherein the data communication system is a cellular telephone network.

25. A hardware arrangement according to claim 20 wherein the first device is a terminal of a cellular network.

26. A terminal of a wireless data communication network, comprising:
means for transmitting signals;
means for receiving signals;
means for saving information and using it in the wireless terminal;
a control unit for controlling the operation of the wireless terminal; and
means for creating an electronic data file including owner identification from information residing in the memory of the wireless terminal, which means includes:
means for establishing a direct connection with a backup service associated with the wireless data communication network; and
means for sending a save request message to the backup service;
means for receiving a saving instruction from the backup service;
a device that operates to alter the electronic data file utilizing the saving instruction such that it becomes unusable without further information; and
means for transferring the electronic data file, which has been rendered unusable, directly to a second electronic device without using resources of the wireless data communication network.

27. A terminal according to claim 26 which terminal further comprises means for restoring the electronic data file stored in a second electronic device to the terminal in usable form.

28. A terminal according to claim 27 wherein the means for restoring an electronic data file comprise:
means for contacting a backup service in the cellular network;
means for sending a restore request message to the backup service;
means for receiving a data file restore instruction from the backup service; and
means for restoring an existing electronic data file into the memory of the terminal according to the restore instruction received from the backup service.

* * * * *